US011691114B2

(12) United States Patent
Darmstaedter et al.

(10) Patent No.: US 11,691,114 B2
(45) Date of Patent: Jul. 4, 2023

(54) METHOD AND MIXING PLANT FOR THE BATCH-BASED PRODUCTION OF A FLOWABLE COATING MATERIAL

(71) Applicant: BASF Coatings GmbH, Münster (DE)

(72) Inventors: Patrick Peter Darmstaedter, Muenster (DE); Jan Berg, Muenster (DE); Jeremy Fouillet, Muenster (DE)

( * ) Notice: Subject to any disclaimer, the term of this patent is extended or adjusted under 35 U.S.C. 154(b) by 778 days.

(21) Appl. No.: 16/614,703

(22) PCT Filed: May 17, 2018

(86) PCT No.: PCT/EP2018/062900
§ 371 (c)(1),
(2) Date: Nov. 18, 2019

(87) PCT Pub. No.: WO2018/211011
PCT Pub. Date: Nov. 22, 2018

(65) Prior Publication Data
US 2020/0070112 A1 Mar. 5, 2020

(30) Foreign Application Priority Data
May 19, 2017 (EP) ..................................... 17171969

(51) Int. Cl.
*B01F 33/84* (2022.01)
*G05D 11/13* (2006.01)
(Continued)

(52) U.S. Cl.
CPC .......... *B01F 33/84* (2022.01); *B01F 35/2131* (2022.01); *B01F 35/2132* (2022.01);
(Continued)

(58) Field of Classification Search
CPC ...... B01F 33/84; B01F 35/2202; B01F 35/82; G05D 11/138; G05D 11/134
(Continued)

(56) References Cited

U.S. PATENT DOCUMENTS 6,533,449 B1 3/2003 Auad
6,866,411 B1 3/2005 Stelzer et al.
(Continued)

FOREIGN PATENT DOCUMENTS

DE 1962864 A1 3/1971
DE 69910992 T2 7/2004
(Continued)

OTHER PUBLICATIONS

English translation of International Search Report for International Application No. PCT/EP2018/062900, dated Jun. 28, 2018, 2 pages.

*Primary Examiner* — Marc C Howell
(74) *Attorney, Agent, or Firm* — Armstrong Teasdale LLP

(57) ABSTRACT

Disclosed is a method for the batch-based manufacture of a flowable coating material, in particular water-based or solvent-containing paint, from a plurality of components. The method includes feeding batch components into a process mixing container, mixing the components in the process mixing container to form a mixture having a preliminary composition, transferring at least part of the mixture having the preliminary composition from the process mixing container into a reception container, ascertaining an actual state of the mixture having the preliminary composition during transfer into the reception container, determining a deviation of the actual state of the mixture having the preliminary composition from a predefined setpoint state, ascertaining an adjustment quantity for the components required to reach the setpoint state, and topping up the adjustment quantity of the (Continued)

components into the preliminary mixture, while the preliminary mixture is being transferred from the process mixing container into the reception container.

20 Claims, 1 Drawing Sheet

(51) Int. Cl.
  *B01F 35/82* (2022.01)
  *B01F 35/21* (2022.01)
  *B01F 35/22* (2022.01)
  *B01F 101/30* (2022.01)

(52) U.S. Cl.
  CPC ...... *B01F 35/2134* (2022.01); *B01F 35/2136* (2022.01); *B01F 35/2202* (2022.01); *B01F 35/82* (2022.01); *G05D 11/134* (2013.01); *G05D 11/138* (2013.01); *B01F 2101/30* (2022.01)

(58) Field of Classification Search
  USPC ..................................... 366/151.1
  See application file for complete search history.

(56) References Cited

U.S. PATENT DOCUMENTS

| | | | |
|---|---|---|---|
| 7,363,115 B2* | 4/2008 | Anderson | ............ G05D 11/139 |
| | | | 366/132 |
| 2003/0004229 A1* | 1/2003 | Schermacher | ...... B01F 35/2202 |
| | | | 523/303 |
| 2004/0057334 A1 | 3/2004 | Wilmer et al. | |
| 2007/0251596 A1* | 11/2007 | Scherzer | ............ B01F 27/0722 |
| | | | 366/132 |
| 2011/0054071 A1 | 3/2011 | Mattmann et al. | |

FOREIGN PATENT DOCUMENTS

| | | |
|---|---|---|
| JP | H04200627 A | 7/1992 |
| JP | H06210209 A | 8/1994 |
| JP | H07286149 A | 10/1995 |
| JP | 2008031115 A | 2/2008 |
| JP | 5008815 B2 | 8/2012 |
| JP | 2012166464 A | 9/2012 |
| KR | 1020110021769 A | 3/2011 |
| RU | 2245188 C2 | 1/2005 |
| WO | 2009143348 A1 | 11/2009 |
| WO | 2013081812 A1 | 6/2013 |
| WO | 2018210559 A1 | 11/2018 |
| WO | 2018210560 A1 | 11/2018 |
| WO | 2018210562 A1 | 11/2018 |

* cited by examiner

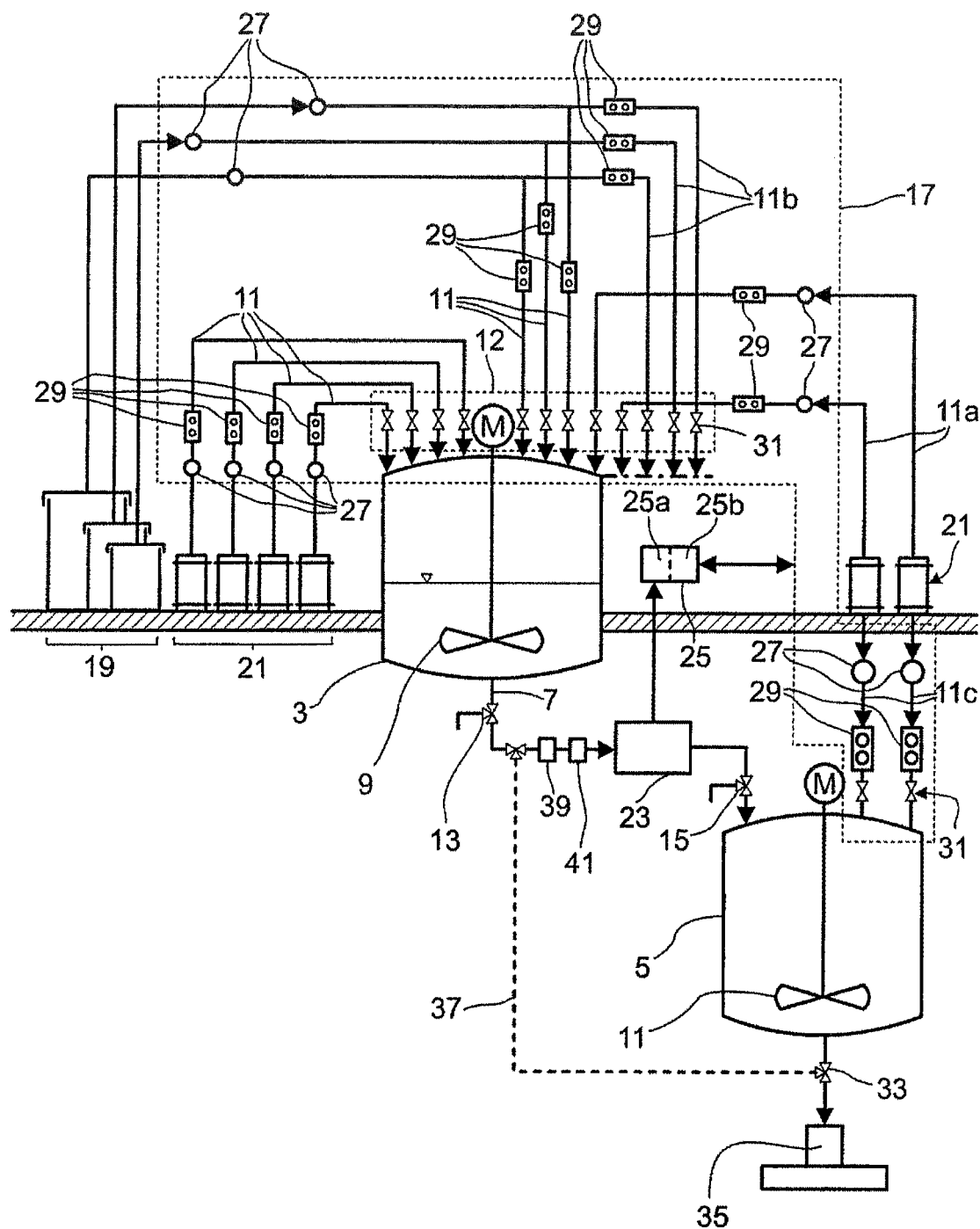

METHOD AND MIXING PLANT FOR THE BATCH-BASED PRODUCTION OF A FLOWABLE COATING MATERIAL

CROSS-REFERENCE TO RELATED APPLICATIONS

This application is a U.S. National Phase Application of PCT/EP2018/062900, filed May 17, 2018, which claims the benefit of priority to EP Application No. 17171969.3, filed May 19, 2017, the contents of which are hereby expressly incorporated by reference in their entirety.

The invention relates to a method for the batch-based manufacture of a flowable coating material, in particular water-based or solvent-containing paint, from a plurality of components. The invention furthermore relates to a mixing system for the batch-based manufacture of a flowable coating material, in particular water-based or solvent-containing paint, from a plurality of components.

Methods and mixing systems of the aforementioned type are widely known. They conventionally contain one or more mixing containers, in which the components of the coating material to be produced are combined after prior weighing in to form a batch or a production run of a product. Such a production run of the coating material to be produced may in this case be produced from a plurality of batches which are finally mixed together. The composition of the individual batches of a production run may, however, vary as a result of specifications.

Since the weighing in of the liquid or pourable components can be carried out only with limited accuracy, and even minor deviations in terms of the proportion of the individual components in the overall mixture sometimes have an effect on the properties of the coating material to be produced, or the specification-relevant proportional raw material mixture of the production run, monitoring of the composition of the components during and/or after the mixing process is unavoidable. In the prior art, this is generally achieved by producing a homogeneous mixture having a preliminary composition after weighing in all the components for the coating material to be produced of a batch. From this mixture, after interrupting the mixing process, a sample is then taken which is examined as it were offline for its production quality, i.e. one or more product properties. Such a process is described, for example, in WO 2013/081812 A1. This comprises ascertainment of an actual state of the mixture and comparison of this actual state with a predefined setpoint state. Deviations are compensated for by subsequently adding one or more components into the homogeneous mixture having a preliminary composition. If required, the match between the setpoint state and the actual state is ensured by means of repeating the sampling.

One disadvantage which is observed with this procedure is, on the one hand, the required time expenditure which is incurred by the sampling and evaluation, as well as the interruption of the mixing process. Another disadvantage linked with this is that the process mixing container in which the weighing in takes place, and with it the weighing-in equipment, is occupied for the entire time until the outlet of the fine adjustment of the component weighing in, and is not available for other uses.

The object of the invention was consequently to improve a method and a mixing system of the type mentioned in the introduction, in such a way that the disadvantages described above are overcome as far as possible. In particular, the object of the invention was to ensure more time-efficient operation in a method and a mixing system of the type mentioned in the introduction.

In a first aspect, the invention achieves its object by providing a method having the features of claim 1. The invention proposes a method for the production run-based manufacture of a flowable coating material, in particular water-based or solvent-containing paint, from a plurality of components, which comprises the steps:

feeding components for a production run into a process mixing container, substantially in a quantity predetermined for the respective production run, mixing the components in the process mixing container in order to form a preferably homogeneous mixture having a preliminary composition, transferring at least a part of the mixture having a preliminary composition from the process mixing container into a reception container, ascertaining an actual state of the mixture having a preliminary composition during the transfer into the reception container, determining a deviation of the actual state of the mixture having a preliminary composition from a predefined setpoint state, ascertaining an adjustment quantity for the components, which is required in order to reach the setpoint state, and topping up the adjustment quantity of the components into the mixture having a preliminary composition, while the mixture having a preliminary composition is already being transferred from the process mixing container into the reception container.

In a first preferred alternative, all the components of the batch are fed into the process mixing container.

In a second preferred alternative, only some components are fed into the process mixing container, namely in particular those components which are specification-relevant for the coating material to be produced, while the other components for the batch are fed into the reception container. Specification-relevant components are, for example, those components which define the hue of the coating material, in particular pigment pastes.

The invention is based on the discovery that there is a significant saving potential in terms of the time required for producing the production run of the coating material in an uninterrupted manufacturing process between weighing in and provision of the coating material in the reception container. The invention addresses this by providing that the preliminary mixture is already checked quasi-online for one or more production properties during the transfer from the process mixing container into the reception container, by determining the actual state of the preliminary mixture, and comparing it with a predefined setpoint state of the preliminary mixture, during the checking. Because the topping up of the components still lacking in order to match the actual state to the setpoint state is likewise carried out during the transfer of the preliminary mixture from the process mixing container into the reception container, the success of the topping up can be checked directly "online". This reduces the time requirement for the production of a production run of the coating material, since the mixing process no longer needs to be stopped for sampling.

The product quality of the coating material to be produced is potentially increased since both the original weighing in for producing the preliminary mixture and the topping up for the fine adjustment from the preliminary mixture to the composition for the coating material to be produced can be carried out in each case with raw materials from the same reactant raw material production run.

The method according to the invention is advantageously refined by comprising the steps:
- obtaining the coating material by means of progressive homogenization of the mixture having a preliminary composition together with the adjustment quantity in the reception container, and
- removing the coating material from the reception container.

In another preferred embodiment of the method, the step of transferring the mixture having a preliminary composition starts after it has been mixed for a predetermined time in the process mixing container and is homogeneous. The mixing in the process mixing container is preferably carried out until, under visual inspection, there is a uniform color and consistency of the mixture having a preliminary composition.

In a particularly preferred configuration of the method, the mixture having a preliminary composition passes through a measuring device, which is arranged between the process mixing container and the reception container and in which the actual state of the mixture having a preliminary composition is ascertained by means of one or more measuring instruments, for transfer into the reception container.

Preferably, the actual state is ascertained by means of measuring one or more characteristic parameters of the mixture having a preliminary composition, the setpoint state being defined by means of predefined target values of the characteristic parameters of the mixture having a preliminary composition. The characteristic parameters are preferably selected from the list consisting of: viscosity, pH, hue, transparency, density and/or particle size.

The conductivity may, for example, be determined by means of one or more conductive and/or inductive conductivity sensors. The transparency may, for example, be determined by means of one or more refractometers and/or transmission sensors. The viscosity may, for example, be determined by means of a Coriolis mass flow meter or another viscometer. The density and mass flow may also be determined by means of one or more Coriolis mass flow meters. The hue may be determined by means of optical measurement sensors. The particle size may, for example, be determined by means of a laser diffraction measurement system.

Particularly preferably, the ascertainment of the actual state is carried out continuously during the transfer in the reception container.

In a first preferred alternative of the method according to the invention, the topping up of the components is carried out by means of introduction directly in the process mixing container. In this way, both the process mixing container and the reception container can be used to mix in topped-up material. Furthermore, the effect of the topping up is visible directly in the checking of the actual state during the transfer into the reception container. To this end, for example for the hue, a mixing calculation of the product properties is preferably carried out in the evaluation unit, this taking into account the material distribution between the process mixing container and the reception mixing container, i.e. the quantity of material which has already been transferred into the reception container before the step of topping up. In this way, the properties of the hue for a coating material are adapted to the overall production run during the transfer of the remaining production run component from the process mixer.

As an alternative or in addition, topping up of the components is preferably carried out by means of introduction directly into the reception container. This allows a further time saving and in particular is preferred for the production of coating materials which under certain circumstances do not need to be colorimetrically corrected. Particularly preferably, the topping up of the components directly into the reception container is carried out with those components whose proportion in the preliminary mixture influences the viscosity and/or the pH.

As an alternative or in addition, topping up of the components is preferably carried out by means of introduction into a fluid line, which is fluidically connected to the process mixing container on the one hand and to the reception container on the other hand in order to transfer the mixture having a preliminary composition from the process mixing container into the reception mixing container, at a position upstream of the one or more measuring devices which detect the actual state of the mixture having a preliminary composition.

The method is preferably refined by the step:
- cleaning of the process mixing container, and preferably of the measuring device, in order to prepare for a subsequent batch of the same or a different flowable coating material, as soon as the preliminary mixture has been transferred into the reception container and before the homogenization in the reception container has been completed. The effect achieved by this is that the process mixing container can already be used again for the production of a new batch of a coating material, optionally with a different composition, before the previous production run has left the reception container. The infrastructure of the process mixing container may in this way be used optimally, and high utilization of the production remains ensured. Preferably, the measuring device configured for the hue determination is also used for monitoring the quality of the cleaning state in the process system.

The method is preferably refined by the step:
- microhomogenization of the mixture having a preliminary composition during the transfer from the process mixing container into the reception mixing container. The microhomogenization is preferably carried out by using an in-line dissolver (ILD) in the fluid line between the process mixing container and the reception mixing container. The ILD is preferably configured in order to mix and disperse the mixture having a preliminary composition at least partially.

The method furthermore preferably comprises the step:
- filtration of the mixture having a preliminary composition during the transfer from the process mixing container into the reception container. Preferably, a filter is fitted into the fluid line between the process mixing container and the reception container, for example into a filter housing.

The method is advantageously refined by furthermore comprising the following steps:
- collecting a plurality of batches consisting of the components and the adjustment quantities for each batch in the reception container,
- progressively homogenizing the batches in the reception container, until the coating material is obtained, and
- removing the coating material as a production run from the reception container.

In preferred embodiments of the invention, the dosing device is adapted in order to allow manual topping up, and/or in order to carry out automatic topping up of one, several or all of the components. In particular, components which influence the hue of the coating material are preferably topped up manually via the dosing device.

Owing to the fact that a plurality of batches can be collected in the reception container, the influence of any weighing-in errors, which may occasionally occur as before, is further reduced. Furthermore, large production runs can be produced with high precision in terms of composition.

Particularly preferably, the volume of the reception container is an integer multiple of the process mixing container, for example two, three or four times.

Preferably, two or more components for the coating material to be produced are weighed simultaneously into the process mixing container. Simultaneous weighing in is preferred for main constituents of the coating material, for example resin systems or solvents.

Particularly in those embodiments of the method according to the invention in which a production run is produced from a plurality of batches, the first batch produced in the method sequence and transferred into the reception container preferably defines a master batch, and one or more batches for the production run, which follow the master batch, define a respective clone batch. If topping up of individual or several components has been necessary for the master batch, the quantity respectively topped up is preferably already weighed into the process mixing container when weighing in the components for the respective clone batches with the feeding of those components into the process mixing container for the respective clone batch. In this way, the topping-up outlay and therefore the manufacturing time for the respective clone batches, and therefore for the production run overall, is reduced significantly. This form of production, in combination with a reception container which is enlarged in comparison with the process mixing container, offers the additional effect that very large production runs can be produced from one master batch and a plurality of clone batches, in which case a high precision in terms of the composition of the production run is achieved by the cloning with minimized adjustment outlay of the quantities fed in and those topped up. At the same time, the time requirement for production of the production run is reduced by virtue of the cloning in combination with the enlarged reception container volume.

Furthermore, the method according to the invention is preferably refined by comprising the following steps:
  returning the finally homogenized coating material, which has been produced, by means of a circulating line from the reception container to the measuring device,
  re-transferring via the measuring device into the reception container, and
  determining an actual state of the coating mixture during the transfer into the reception container.

With the returning and transferring of the finalized production run past the measuring device, final quality control of the homogenized production run is possible without additional equipment outlay.

The invention has been described above in a first aspect with the aid of the method according to the invention. In a second aspect, in a mixing system of the type mentioned in the introduction, the invention achieves the object mentioned in the introduction by the mixing system comprising: a process mixing container, which is configured in order to receive components for a batch, essentially in a quantity respectively predetermined for the batch, and in order to mix the components in the process mixing container in order to form a homogeneous mixture having a preliminary composition, a reception container, a fluid line, which is fluidically connected to the process mixing container and the reception container in order to transfer the mixture having a preliminary composition from the process mixing container into the reception mixing container, a measuring device, which is assigned to the fluid line and is configured in order to ascertain an actual state of the mixture having a preliminary composition during the transfer into the reception container, an evaluation unit, which is in communication with the measuring device and is configured in order to determine a deviation of the actual state of the mixture having a preliminary composition from a predefined setpoint state, and in order to ascertain an adjustment quantity for the components, which is required in order to reach the setpoint state, and preferably a dosing device, which is configured in order to top up components into the mixture having a preliminary composition as a function of the required adjustment quantity, while the mixture having a preliminary composition is already being transferred from the process mixing container into the reception container.

In preferred embodiments of the invention, the dosing device is adapted in order to allow manual topping up, and/or in order to carry out automatic topping up of one, several or all of the components.

The mixing system according to the invention adopts the advantages and preferred embodiments of the method according to the invention. Preferred embodiments of the method according to the invention are also preferred embodiments of the mixing system according to the invention, and vice versa, for which reason reference is made in this regard also to the comments above regarding the method according to the invention.

The process mixing container preferably comprises one or more mixing elements, for example stirring members, for combining and homogenizing the weighed-in components to form the mixture having a preliminary composition.

The reception container preferably comprises one or more mixing elements, for example stirring members, for progressively homogenizing the mixture transferred into the reception container so that the final coating material is obtained.

In a preferred embodiment, the measuring device comprises a measurement section, which is arranged in the fluid line and in which for its part one or more measuring instruments for detecting the actual state of the mixture are arranged. The measuring instrument or instruments are preferably configured in order to quantitatively detect one or more of the following characteristic parameters:
  Viscosity, pH, hue, density, transparency, conductivity and/or particle size.

The measuring device and the evaluation unit are preferably configured in order to detect the actual state of the mixture having a preliminary composition continuously during the transfer into the reception container.

The dosing device preferably comprises a feed line for each component, which line can be connected to a (fixed or replaceable) raw material source. Arranged in the feed line, there is preferably in each case a sensor for detecting the throughput (mass flow and/or volume flow). Furthermore, a valve for selective opening or closing of the feed line is preferably arranged in each of the feed lines. The dosing device is preferably connected to an electronic control unit, in such a way as to transmit signals, this unit in turn being connected to the evaluation unit, or being integrated into the evaluation unit. The electronic control unit is preferably configured in order to ascertain quantitative values for the components to be topped up on the basis of the characteristic parameters relating to the actual state of the preliminary mixture, which are transmitted by the evaluation unit, and in order to open and close the valves in the feed lines of the dosing device so that the ascertained quantities to be topped up of the components are introduced into the process mixing container and/or the reception container in a way that can be tracked and preferably regulated by means of the sensors installed in the feed lines for detecting the throughput. As an alternative or in addition, however, the components (raw material quantities) added are calculated by re-weighing/net weighing of the sources of the components (raw material containers) after removal of the setpoint quantity by placing them on weighing cells, pressure measuring units or similar weighing apparatuses. As an alternative or in addition, feeding of already pre-weighed quantities of a component (raw material) for a batch is carried out, i.e. preloading of this component offline from the process system, in order to ensure the required accuracy of the material supply of a raw material.

For the dosing, in preferred embodiments, instead of a combination of a controlled valve and a throughput sensor, dosing valves are proposed which can be controlled accurately in terms of volume, without a separate throughput measurement being required. For example, pinch valves or needle valves may be used for the dosing, the output quantity of which valves can be controlled with high accuracy by controlling the delivery cycles or delivery durations. As an alternative, the use of membrane valves, spindle valves or other volume-delivering dosing valves is proposed.

In preferred configurations, the feed lines of the mixing system according to the invention are selectively connected fluidically to the process mixing container and/or to the reception container, in order to allow topping up directly into the respective container.

The fluid line arranged between the process mixing container and the reception container preferably comprises one or more outlets, which can be closed in a fluid-tight manner, for cleaning the fluid line, in particular by means of compressed air and/or a washing liquid. For cleaning purposes, the fluid line preferably comprises shut-off members both on the side of the process mixing container and on the side of the reception container, which shut-off members can be closed in a fluid-tight and preferably pressure-tight manner for carrying out cleaning of the fluid line.

In a preferred embodiment, the process mixing container is equipped with one or more exit openings for cleaning the process mixing container after the preliminary mixture has been transferred in the direction of the reception container.

The feed lines of the dosing device are preferably each assigned pumps, which are likewise in communication with the electronic control unit in order to feed the components.

In one preferred embodiment, the process mixing container, and/or the fluid line between the process mixing container and the reception mixing container, is fluidically connected to a dedicated cleaning agent supply line, by means of which cleaning liquid can be introduced into the process mixing container and/or the fluid line. Continuous ascertainment of the cleaning result of the mixing container by the hue measuring device is furthermore possible.

The invention will be described in more detail below with reference to the appended figure with the aid of a preferred exemplary embodiment.

The FIGURE shows a mixing system according to the invention in a schematic representation according to a preferred exemplary embodiment.

The mixing system 1 shown in the FIGURE, for the production run-based production of a coating material, comprises a process mixing container 3 and a reception container 5. The process mixing container 3 and the reception container 5 are connected fluidically by means of a fluid line 7.

At least one mixing element, for example in the form of a motor-driven stirring mechanism 9, 11, is respectively arranged in the process mixing container 3 and the reception container 5.

The fluid line 7 is configured in order to transfer a preliminary mixture from the process mixing container 3 into the reception container 5, and preferably comprises a first and a second shut-off member 13, 15 on the inlet side and the outlet side. The shut-off member 13, 15 is preferably configured respectively as a three-way shut-off member, so that one of the exits can be used for introduction and release of cleaning fluid. Optionally, the respective exit may be fluidically connected to a fixedly installed cleaning agent supply.

The mixing system 1 furthermore comprises a dosing device 17, which is configured for controlled feeding of the individual components of the coating material to be produced. The dosing device 17 comprises a plurality of feed lines 11a,b,c, which can be fluidically connected selectively to fixedly installed raw material containers 19 or changeable replaceable vessels 21.

Main constituents of the coating material to be produced, which may be expected to be the same for the majority of coating materials to be produced, are preferably stored in the fixedly installed raw material containers 19, while components which may vary depending on the coating material to be produced are preferably stored in the replaceable vessels 21.

Arranged in the fluid line 7 between the process mixing container 3 and the reception container 5, there is a measuring device 23 which is configured for continuous determination of the actual state of the preliminary mixture of individual components contained in the process mixing container 3, while these are being transferred from the process mixing container 3 into the reception container 5. To this end, one or more measuring instruments are arranged in the measuring device 23, which are preferably configured in order to determine one, several or all of the following: pH, viscosity, hue, transparency, density and/or particle size.

The measuring device 23 is connected, in such a way as to transmit signals, to an evaluation unit 25a which is configured in order to compare the actual state of the preliminary mixture, detected by the measuring device 23 and transmitted to the evaluation unit 25a, with a predefined setpoint state for the preliminary mixture for production of the coating material. The evaluation unit 25a is connected, in such a way as to transmit signals, to an electronic control unit 25b. The evaluation unit 25a and the control unit 25b are alternatively configured as separate instruments or, as shown, as one unit (reference 25). If a deviation is found for the parameters ascertained by the measuring device 23, i.e. for example viscosity, pH, hue, etc., of the actual state from the respective setpoint state, the electronic control unit 25b is configured in order to operate the dosing device 17 in such a way as to compensate for the discrepancy between the actual state and the setpoint state.

The controlled topping up of individual components into the mixture having a preliminary composition will be described below with reference to the example of monitoring the pH of the mixture. After the components required for the batch to be processed in the process mixing container 3 have been weighed into the process mixing container 3, and homogenization of the mixture having a preliminary composition has been carried out, which allows transfer and checking of the mixture having a preliminary composition, the pH of the mixture is measured in the fluid line 7 by the measuring device 23 with a correspondingly configured measuring instrument during the transfer of the mixture having a preliminary composition into the reception container.

The evaluation unit 25a compares the measured pH with a predetermined setpoint value. If an unacceptably large difference between the actual value and the setpoint value is found in terms of the measured pH, the evaluation unit 25a calculates by means of mathematical models the quantity to be topped up of that component which is responsible for an adaptation of the pH, which may for example be a DMEA solution (DMEA=dimethylethanolamine). The transfer of the mixture having a preliminary composition in the direction of the reception container may optionally be interrupted for the duration of the topping up.

When carrying out the topping up, either the required quantity of the component to be topped up is output on a display instrument, or the evaluation unit 25a communicates with the control unit 25b in order to initiate delivery via the dosing device 12 into the process mixing container. In the process mixing container 3, the component quantity newly introduced is mixed into the mixture having a preliminary composition by means of the stirring member 9, until a homogeneous batch is in turn obtained.

In this way, sometimes with iterative steps, material of the components for the batch of the coating material to be produced is topped up until the monitored parameter, in this case the pH, passes the actual/setpoint comparison.

The checking of the next product property is then carried out.

In the event that topping up of the component influencing the respectively measured product property is not specification-relevant, and, as described above, topping up can be carried out directly into the reception container, iterative topping up does not generally need to be carried out.

While adaptation of the pH may be carried out by means of adding the above-described DMEA solution, adaptation of the viscosity may for example be carried out by means of adding water.

The adaptation of the hue may be carried out by means of adding corresponding color pigments.

Preferably, as an alternative or in addition, the dosing device 17 is manually controllable, in order to carry out manual topping up of one, several or all of the components. For manual topping up by means of the dosing device 17, it is advantageous for the electronic control unit 25b to be configured in order to transmit the deviation, ascertained by the evaluation unit 25a, between the actual state and the setpoint state to a display device (not represented here).

To this end, in each of the pipelines 11a,b,c, the dosing device 17 comprises means 27 for delivering the component flowing in the respective feed line. The delivery means 27 are, for example, configured as pumps.

Furthermore, in each of the feed lines 11a,b,c, the dosing device 17 comprises one or more sensors for throughput measurement, for example formed as Coriolis mass flow meters 29.

Furthermore, for each feed line 11a,b,c, the dosing device 17 preferably comprises one or more valves 31. Some, several or all of the valves 31 are preferably arranged in a dosing carousel 12 on the process mixing container 3.

Components of which, according to expectation, relatively large quantities need to be delivered for the coating material to be produced are, as an alternative or in addition, preferably connected directly to the process mixing container 3b by means of the feed lines 11b, without being fed via the dosing carousel 12.

Some of the feed lines, namely the feed lines 11c shown in the FIGURE, are fluidically connected directly to the reception container 5.

The electronic control unit 25 is configured in order, preferably with integration of the flow meter 29, to top up a regulated flow of individual components into the process mixing container 3 or the reception container 5 by means of operating the delivery means 27 and the valves 31.

The reception container 5 comprises an exit valve 33, in order to be able to fill one or more transport containers 35 with the coating material after completion of the production of the coating material.

The exit valve 33 may for example be configured as a multiway valve, and the mixing system 1 may preferably furthermore comprise a circulating line 37, by means of which the coating material can be delivered into the fluid line 7 upstream of the measuring device 23, in order to be able to check by means of the measuring device 23 the product properties of the coating material being produced.

Optional refinements of the mixing system 1, which are not represented in FIG. 1, relate on the one hand to the optional topping up of components of the coating material directly into the fluid line 7. To this end, additional or alternative feed lines would need to be provided from the raw material containers 19, 21, or from the dosing device 12, to the fluid line 7 upstream of the measuring device 23, these not being shown here for the sake of simpler representation.

On the other hand, the possibility of manual feeding of the component into the process mixing container 3 upstream of the dosing device 12 is preferably provided for one, several or all of the components. This is also not explicitly represented for the sake of simpler representation.

A filter insert 39 is preferably mounted in the fluid line 7, upstream of the measuring device 23. Furthermore, an in-line dissolver (ILD) 41 is preferably arranged in the fluid line 7, likewise upstream of the measuring device 23.

The operation of the mixing system will be described by way of example below in accordance with the appended figure.

First, it is established which components are required for the coating material production run to be produced. The components are provided in the fixedly installed raw material containers 19 or replaceable vessels 21. Depending on the coating material to be produced, a first weigh-in is then carried out by feeding the required components into the process mixing container 3 by means of the feed lines 11a,b, preferably by means of control by the electronic control unit 25b. To this end, the electronic control unit 25b operates the respective delivery means 27 and opens or closes the valves 31 in accordance with the delivery quantities detected by the flow sensors 29.

After the feeding of the components for the production run to be manufactured has been carried out according to specification, the components are mixed in the process mixing container 3 by actuating the motor-driven stirring mechanism 9, so that a preliminary mixture is obtained. The preliminary mixture should have a uniform consistency and color under optical inspection.

As soon as the preliminary mixture has been obtained in sufficient quality, the transfer of the preliminary mixture through the fluid line 7 into the reception container 5 begins. In this case, the actual state of the preliminary mixture is ascertained by the measuring device 23 during the transfer. The ascertained actual state, which is in the form of measurement values of the measuring instruments arranged in a measurement section, is transmitted to the evaluation unit 25*a*. The evaluation unit 25*a* determines whether the actual state of the preliminary mixture differs from a setpoint state differing for the coating material to be produced. If there is a difference, the evaluation unit 25*a* ascertains which adjustment quantity (quantities) of the respective component(s) is or are required in order to match the actual state to the setpoint state. On the basis of this determination, the evaluation unit 25*a* communicates in a top-up request to the control unit 25*b*, and the control unit 25*b* operates the dosing device 17. Alternatively, manual topping up is carried out on the basis of the determination.

If, for example, the measuring device 23 establishes that the pH of the preliminary mixture lies below the setpoint state, the dosing device 17 is operated so that the component which crucially influences the pH is topped up in the required quantity. The magnitude of the difference in this case determines the quantity of the component to be topped up.

The topping up is preferably carried out into the process mixing container 3. If, however, a coating material which does not need to be re-checked after the weighing in of the coating raw materials is being produced, the topping up of at least some components is preferably carried out directly into the reception container 5. Preferably, the components delivered through the feed line 11*c* are correspondingly responsible crucially for influencing the pH and the viscosity, but not the hue.

Preferably, pre-weighing/weighing in of specification non-relevant proportions of a production run of the coating material to be produced is carried out directly in the reception container. Hue-sensitive components are preferably weighed into the process mixing container proportionally to the production run to be produced, and then monitored during the transfer into the reception container by means of the measuring device 23 in respect of the product properties and determination of the actual state, and if necessary corrected by topping up. Final mixing of the components for the production run may then be carried out in the reception container.

As soon as the process mixing container 3 has been fully emptied into the fluid line 7 and the reception container 5, the process mixing container 3 may be separated from the fluid line 7, for instance by closing the shut-off member 13, and prepared by means of cleaning etc. for a subsequent batch and/or a subsequent production run.

Likewise, the fluid line 7, after it has been fully emptied into the reception container 5 and the transfer of the preliminary mixture into the reception container 5 is completed, may be cleaned using the shut-off members 13 and 15. The cleaning is preferably carried out by means of flushing with a cleaning liquid, by means of pig technology and/or by means of compressed air cleaning.

As an alternative to the combination, shown in the FIGURE, of the delivery means 27, flow sensor 29 and valve 31, other dosing mechanisms may also be provided, for example with the use of gravity-based material delivery and dosing valves which are configured as volume deliverers or contain integrated mass or volume flow detectors.

While the progressive homogenization from the preliminary mixture to the final coating material is still being carried out in the reception container 5, in a preferred configuration of the method according to the invention, in the process mixing container 3 the feeding of components for a subsequent batch of the same coating material or a different coating material to be produced is already started.

If the intention is to produce a further batch of the same coating material as that which is already being homogenized in the reception container 5, it may be transferred during continuous operation into the reception container 5, so that the reception container 5 (if it is dimensioned to be large enough) may collect and homogenize a plurality of batches. In this way, any dosing errors which may occur in a batch affect the overall production run less, so that the reproducibility of the manufacturing is improved.

The production of a production run by means of a plurality of batches is further improved in that a first batch for the production run to be produced as it were defines a master batch for the coating material to be produced:

The required topping up of individual components, ascertained for the first batch weighed in in the process mixing container, is preferably saved, and jointly weighed into the process mixing container at the very start of the respective feeding process for one or more subsequent batches of the overall production run. This reduces the topping-up outlay for the subsequent batches of the production run, and the manufacturing time can be reduced further. In the measuring device 23, for quality control it is then substantially only necessary to monitor whether the "clone batches" lie sufficiently close to the previously defined "master batch". The final homogenization is advantageously carried out in the reception container during this checking.

The invention claimed is:

1. A method for the batch-based manufacture of a flowable coating material from a plurality of components, comprising the steps:
   feeding components for a batch into a process mixing container (3), essentially in a quantity respectively predetermined for the batch;
   mixing the components in the process mixing container (3) in order to form a mixture having a preliminary composition;
   transferring at least a part of the mixture having a preliminary composition from the process mixing container (3) into a reception container (5), the reception container (5) being that container form which the flowable coating material is filled following completion of the production of the coating material;
   ascertaining an actual state of the mixture having a preliminary composition during the transfer into the reception container (5);
   determining a deviation of the actual state of the mixture having a preliminary composition from a predefined setpoint state;
   ascertaining an adjustment quantity for the components, which is required in order to reach the setpoint state; and
   topping up the adjustment quantity of the components into the mixture having a preliminary composition, while the mixture having a preliminary composition is already being transferred from the process mixing container (3) into the reception container (5).

2. The method as claimed in claim 1, wherein all the components of the batch are fed into the process mixing container.

3. The method as claimed in claim 1, wherein some of the components are fed into the process mixer, and the other components for the batch are fed into the reception container.

4. The method as claimed in claim 1, furthermore comprising the steps:
   obtaining the coating material by means of progressive homogenization of the mixture having a preliminary composition together with the adjustment quantity in the reception container (5); and removing the coating material from the reception container (5).

5. The method as claimed in claim 1, wherein the step of transferring the mixture having a preliminary composition starts after the mixture having a preliminary composition has been mixed for a predetermined time in the process mixing container (3).

6. The method as claimed in claim 1, wherein the mixture having a preliminary composition passes through a measuring device (23), which is arranged between the process mixing container (3) and the reception container (5) and in which the actual state of the mixture having a preliminary composition is ascertained by means of one or more measuring instruments, for transfer into the reception container.

7. The method as claimed in claim 1, wherein the actual state is ascertained by means of measuring one or more characteristic parameters of the mixture having a preliminary composition, and wherein the setpoint state is defined by means of predefined target values of the characteristic parameters of the mixture having a preliminary composition.

8. The method as claimed in claim 7, wherein the characteristic parameters are selected from the list:
   viscosity,
   pH,
   hue,
   density,
   transparency, and/or
   particle size.

9. The method as claimed in claim 1, wherein the ascertainment of the actual state is carried out continuously during the transfer into the reception container (5).

10. The method as claimed in claim 1, wherein the topping up of the components is carried out by means of introduction directly into the process mixing container (3).

11. The method as claimed in claim 1, wherein the topping up of the components is carried out by means of introduction into a fluid line (7) between the process mixing container (3) and the reception container (5).

12. The method as claimed in claim 1, wherein the topping up of the components is carried out by means of introduction directly into the reception container (5).

13. The method as claimed in claim 1, comprising:
   cleaning of the process mixing container (3) in order to prepare for a subsequent production run of the same or a different flowable coating material, as soon as the mixture having a preliminary composition has been transferred into the reception container (5) and before the homogenization in the reception container (5) has been completed.

14. The method as claimed in claim 1, comprising:
   collecting a plurality of homogeneous batches consisting of the components and the adjustment quantities for each batch in the reception container (5);
   progressively homogenizing the batches in the reception container (5), until a production run of a coating material is obtained; and
   removing the coating material of the production run from the reception container (5).

15. The method as claimed in claim 14, wherein the first batch produced by the method as claimed in claim 1 defines a master batch, and one or more subsequent batches respectively define a clone batch and are produced in the method by the quantities of one or more components to be topped up, which are topped up for the master batch, already being weighed into the process mixing container with the feeding of the components for the respective clone batch.

16. The method as claimed in claim 6, comprising:
   returning the finally homogenized coating material, which has been produced, by means of a circulating line (37) from the reception container (5) to the measuring device (23) and re-transferring via the measuring device (23) into the reception container (5), and determining an actual state of the coating mixture during the transfer into the reception container (5).

17. The method as claimed in claim 3, wherein those components which are specification relevant for the coating material to be produced are fed into the process mixer, and the other components for the batch are fed into the reception container.

18. The method as claimed in claim 11, wherein the topping up of the components is carried out by means of introduction into a fluid line (7) between the process mixing container (3) and the reception container (5), upstream of the measuring device (23).

19. The method as claimed in claim 13, further comprising cleaning of the measuring device (23).

20. A mixing system (1) for the batch-based manufacture of a flowable coating material from a plurality of components, comprising:
   a process mixing container (3), which is configured in order to receive components for a batch, essentially in a quantity respectively predetermined for the batch, and in order to mix the components in the process mixing container (3) in order to form a mixture having a preliminary composition;
   a reception container (5), the reception container (5) being that container from which the flowable coating material is filled following completion of the production of the coating material, and an outlet for removing the flowable material after completion thereof;
   a fluid line (7), which is fluidically connected to the process mixing container (3) and the reception container (5) in order to transfer the mixture having a preliminary composition from the process mixing container (3) into the reception container (5);
   a measuring device (23), which is assigned to the fluid line (7) and is configured in order to ascertain an actual state of the mixture having a preliminary composition during the transfer into the reception container;
   an evaluation unit (25a), which is in communication with the measuring device (23) and is configured in order to determine a deviation of the actual state of the mixture having a preliminary composition from a predefined setpoint state, and in order to ascertain an adjustment quantity for the components, which is required in order to reach the setpoint state; and
   a dosing device (12), which is configured in order to top up components into the mixture having a preliminary composition as a function of the required adjustment quantity, while the mixture having a preliminary composition is already being transferred from the process mixing container (3) into the reception container (5).

* * * * *